(12) United States Patent
Peascoe-Meisner et al.

(10) Patent No.: US 7,438,004 B2
(45) Date of Patent: Oct. 21, 2008

(54) MGAL2O4 SPINEL REFRACTORY AS CONTAINMENT LINER FOR HIGH-TEMPERATURE ALKALI SALT CONTAINING ENVIRONMENTS

(75) Inventors: Roberta A. Peascoe-Meisner, Knoxville, TN (US); James R. Keiser, Oak Ridge, TN (US); James G. Hemrick, Knoxville, TN (US); Camden R. Hubbard, Oak Ridge, TN (US); J. Peter Gorog, Kent, WA (US); Amul Gupta, Jamestown, NY (US)

(73) Assignee: UT-Battelle, LLC, Oak Ridge, TN (US)

( * ) Notice: Subject to any disclaimer, the term of this patent is extended or adjusted under 35 U.S.C. 154(b) by 300 days.

(21) Appl. No.: 11/207,320

(22) Filed: Aug. 19, 2005

(65) Prior Publication Data
US 2007/0042896 A1    Feb. 22, 2007

(51) Int. Cl.
*F23B 7/00* (2006.01)
(52) U.S. Cl. .................................. 110/341; 110/338
(58) Field of Classification Search ................. 110/336, 110/338, 341; 125/23.01
See application file for complete search history.

(56) References Cited

U.S. PATENT DOCUMENTS

| 1,919,801 | A | * | 7/1933 | Newsom | 125/23.01 |
| 4,682,985 | A | * | 7/1987 | Kohl | 48/197 R |
| 5,738,811 | A | * | 4/1998 | Gagel et al. | 264/82 |
| 5,788,762 | A | * | 8/1998 | Barger et al. | 106/706 |
| 6,261,983 | B1 | * | 7/2001 | Gruver | 501/120 |

OTHER PUBLICATIONS

E.D. Larson, S. Consonni and R.E. Katofsky, "A Cost-Benefit Assessment of Biomass Gasification Power Generation in the Pulp and Paper Industry", Final Report, Oct. 8, 2003.

M.N. Mansour, R.R. Chandran and L. Rockvam, "The Evolution Of And Advances In Steam Reforming Of Black Liquor", Proceedings of the 2002 TAPPI Fall Conference & Trade Fair, Sep. 8-11, 2002, San Diego, California.

K. Whitty and L. Baxter, "State of the Art in Black Liquor Gasification Technology", Proceedings of the 2001 Joint AFRC/JFRC International Combustion Symposium, Sep. 9-12, 2001, Kauai, Hawaii (2001).

L. Stigsson, "Chemrec™ Black Liquor Gasification", Proceedings of the International Chemical Recovery Conference, Tampa; Florida, p. 663-692, Jun. 1-4, 1998.

(Continued)

*Primary Examiner*—Kenneth B Rinehart
(74) *Attorney, Agent, or Firm*—Judson R. Hightower

(57) ABSTRACT

A method includes containing a high-temperature alkali salt containing environment using a refractory containment liner containing $MgAl_2O_4$ spinel. A method, includes forming a refractory brick containing $MgAl_2O_4$ spinel having an exterior chill zone defined by substantially columnar crystallization and an interior zone defined by substantially equiaxed crystallization; and removing at least a portion of the exterior chill zone from the refractory brick containing $MgAl_2O_4$ spinel by scalping the refractory brick containing $MgAl_2O_4$ spinel to define at least one outer surface having an area of substantially equiaxed crystallization. A product of manufacture includes a refractory brick containing $MgAl_2O_4$ spinel including an interior zone defined by substantially equiaxed crystallization; and at least one outer surface having an area of substantially equiaxed crystallization.

5 Claims, 6 Drawing Sheets

OTHER PUBLICATIONS

R.A. Peascoe, J.R. Keiser, C.R. Hubbard, J.P. Gorog, C.A. Brown and B. Nilsson, "Comparison Of Refractory Performance In Black Liquor Gasifiers And A Smelt Test System", Proceedings of the International Chemical Recovery Conference, Whistler, British Columbia, p. 297-300, Jun. 11-14, 2001.

J.R. Christie, A.J. Darnell and D. f. Dustin, "Reaction of Molten Sodium Carbonate with Aluminum Oxide", J. Phys. Chem., 82, 1, p. 33-37, 1978.

C.M. Hoffmann, C.R. Hubbard, J.R. Keiser, "Study of Mixed α/β-Alumina and Pure β-Alumina Fused Cast Refractories After Exposure in the Black Liquor Gasifier in New Bern, North Carolina", CRADA Final Report C/ORNL/97-0481, Mar. 3, 1999.

R.A. Peascoe, J.R. Keiser, J.G. Hemrick, M.P. Brady, P. Sachenko, C.R. Hubbard, R.D. Ott, C.A. Blue and J.P. Gorog, "Materials Issues in High Temperature Black Liquor Gasification", Proceedings of the 2003 TAPPI Fall Technical Conference, Chicago, IL, Oct. 26-30, 2003.

C.M. Hoffman, J.R. Keiser, C.R. Hubbard, "Characterization of the Degradation Behavior of High Alumina Silica-Bonded Refractory Used as Gasifier Lining for Black Liquor Gasification", CRADA Final Report C/ORNL/97-0481, Jan. 1999.

P. Gorog, "Update on the Restoration of the New Bern Gasifier", IEA Annex XV Semi-Annual Meeting Stockholm, Sweden, Aug. 25-27, 2003.

\* cited by examiner

Fusion-cast alumina

Bonded spinel

MgO₂ (200) pole figures
fusion-cast spinel

MgAl₂O₄ spinel (400) pole figures
fusion-cast spinel

Fusion-cast spinel

A) Reference fusion-cast alumina
B) Fusion-cast spinel
C) Alternate fusion-cast alumina
D) Bonded spinel

MGAL2O4 SPINEL REFRACTORY AS CONTAINMENT LINER FOR HIGH-TEMPERATURE ALKALI SALT CONTAINING ENVIRONMENTS

FEDERALLY-SPONSORED RESEARCH OR DEVELOPMENT

This invention was made with United States Government support under prime contract No. DE-AC05-00OR22725 to UT-Battelle, L.L.C. awarded by the Department of Energy. The Government has certain rights in this invention.

BACKGROUND INFORMATION

1. Field of the Invention

Embodiments of the invention relate generally to the field of containing high-temperature alkali-containing environments. More particularly, an embodiment of the invention relates to containing a high-temperature alkali containing environment using a $MgAl_2O_4$ spinel refractory containment liner. Other embodiments of the invention relates to a $MgAl_2O_4$ spinel refractory brick and a method of making a $MgAl_2O_4$ spinel refractory brick.

2. Discussion of the Related Art

Gasification of black liquor or biomass material containing alkali compounds is an attractive means of recovering inorganic material while generating heat and pyrolizing the organic material which typically is used as syngas for further processing or generating electricity. Finding containment materials for successful, long term operation are needed to enable commercial development of this process. Degradation of containment materials in pilot-scale and demonstration-scale gasifiers has been a serious obstacle to commercialization of black liquor gasifiers.

When compared to conventional black liquor recovery boilers, combined cycle gasification offers pulp mills the potential to increase energy recovery and reduce gaseous emission while still efficiently recycling the pulping chemicals. Unfortunately, industrial implementation of black liquor gasification has been limited by the lack of refractory and metallic containment materials that survive the prolonged exposure to the gasification environment and molten salts.

If black liquor gasification were fully implemented, then 278 million dry tons of wood processed annually by the U.S. pulp and wood product facilities could potentially be gasified to generate up to 8 gigawatts of electricity from sustainable, renewable raw materials by the year 2020[1].

Many companies have worked on black liquor recycling gasification processes but none have been sufficiently successful for widespread commercial implementation. Industry efforts have centered on two primary processes. A low-temperature (below the melting point of alkali metal salts) gasification process utilizes a fluidized bed. Unfortunately, there are issues with carbon conversion, bed agglomeration and formation of tars[2]. The other process is a high-temperature (above the melting point of alkali metal salts) process. In this case, there are problems associated with containment of the molten salts[3,4]. While an oxygen-blown high-temperature high-pressure (HTHP) gasification process is the ultimate goal, the initial development is at near atmospheric pressures or high-temperature low-pressure (HTLP).

Chemrec AB, a Swedish company, is leading the development of the high temperature process[3,4]. Ultimately, the process is envisioned to operate at about 30 bars pressure (HTHP) with sub stoichiometric oxygen used to gasify the organic components of the black liquor. A near-atmospheric pressure version is also being developed as a supplement for or as a booster for recovery boilers. The operating temperature would be around 950° C. with hydrogen and carbon monoxide as the principal gaseous reaction products.

The Frövi Booster Demonstration Plant was build at Assi-Domän's Frövifors mill in 1991 and taken into full operation later that same year. The system consisted of a 7 tds/24 h air-blown gasification reactor, a quench system and an associated gas cooler. The Frövi Booster was taken out of operation when in 1996 the mill no longer needed the extra capacity. The facility gasified black liquor on a commercial scale and produced green liquor of acceptable quality. The Frövi Booster experienced and solved a number of technical problems over the years. When the gasifier was finally shut down, the one issue that needed further development was the identification of a suitable refractory material to line the gasifier. Several alternatives were tested, and the one selected for further use in the next generation of plants had a life expectancy of at least one year.

Between 1994 and spring 2000, Chemrec operated a pressurized black liquor gasification pilot plant. The plant was located at the STORA Skoghall paper mill near Karlstad, Sweden, and consisted of a refractory-lined entrained flow reactor, quench system and counter-current gas cooler/condenser.

The New Bern commercial gasifier is a 300 tds/24 h unit located at Weyerhaeuser's New Bern mill in North Carolina, USA. The basic design of this facility was essentially a scale-up of the Frövi unit and started up in December 1996. The New Bern gasifier system is air-blown and operates at roughly 950° C. and slightly above atmospheric pressure. The quench system has condensate sprays to cool the gas and is followed by a 3-stage scrubber. The scrubber first cools the gas, during which most of the vapor condenses out. Hydrogen sulfide in the gas is absorbed by weak wash in the second stage. The final stage removes any residual alkali particles before the gas is fired in a power boiler.

Refractories from the Swedish HTHP black liquor gasifier operating during the 1990s and from Weyerhaeuser's New Bern gasifier during its first few years of operation have been characterized[5,6]. These studies showed that reaction with molten sodium salts of the bonded alumina-silica refractories used as the initial lining in the New Bern gasifier produced sodium-containing corrosion products.

Analyses performed on the exposed fusion-cast $\alpha$-/$\beta$-alumina refractory samples removed from both the Swedish HTHP gasifier and the second lining used in the New Bern HTLP gasifier revealed the formation of $NaAlO_2$ resulting from reaction between $Na_2CO_3$ and $Al_2O_3$[7]. In the following reactions

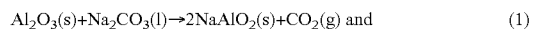

$$Al_2O_3(s)+Na_2CO_3(l) \rightarrow 2NaAlO_2(s)+CO_2(g) \text{ and} \qquad (1)$$

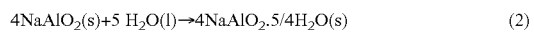

$$4NaAlO_2(s)+5\ H_2O(l) \rightarrow 4NaAlO_2.5/4H_2O(s) \qquad (2)$$

the volume per mole Al changes from 21.2 for $Al_2O_3$ to 49.4 to 74.0 cm3/mole for $NaAlO_2$ and $NaAlO_2.5/4H_2O$ respectively. Thus a significant volume change for $Al_2O_3$ is associated with the formation of $NaAlO_2$ or $NaAlO_2.5/4H_2O$. When bricks removed from the gasifier remain outside for a few months, a layer of Trona $(Na_3(HCO_3)_2(CO_3).2H_2O)$ forms on the surface along with minor amounts of $Na_2CO_3(H_2O)$ and $Na_2Al_2O_4.6H_2O$[6]. This confirms the presence of soluble sodium aluminates within the removed refractory.

In the New Bern gasifier system, black liquor, steam and air are injected into the top of the cylindrically shaped, refractory-lined vessel of the gasifier and pyrolyzed. The liquor and steam are injected through a specially designed spray nozzle while, simultaneously, preheated air is injected through a windbox with angled vanes that impart a swirl pattern to the air flow. The amount of air/steam injected is substoichiometric such that only sufficient reaction occurs to maintain the operating temperature and provide the energy necessary for the reduction of sodium sulfate. When the black liquor is injected into the reactor vessel, the water is volatilized, the organic components are degraded by oxidation or pyrolysis, and the sodium sulfate is reduced, primarily to sodium sulfide and hydrogen sulfide.

The bottom of the cylindrical vessel consists of a refractory cone arrangement that significantly reduces the effective vessel cross-section and directs the flow of the product gas and molten salts downward through the quench sprayers. The inorganic salts drop into the green liquor tank where they dissolve in the aqueous solution in the bottom of the vessel while the product gas is removed from the vessel through a side port. In a BLGCC, this product gas would be cleaned and routed to a gas turbine where it would serve as fuel. The environment inside the gasifier vessel is around 950-1000° C. and consists of gases including several corrosive species including molten alkali salts. This environment is so hostile that no commercially available alloy has been found that can survive for any extended period. Consequently, a refractory lining has been employed for the top dome, the cylindrical barrel and the lower cone, but it has been found that most refractories have a limited lifetime in this environment.

The original New Bern mullite-based refractory liner experienced significant materials degradation after 6 months of operation and was replaced with fusion-cast alumina. This alumina lining experienced materials degradation after a year of operation and significant expansion that led to a shutdown in January 2000.

The current design utilizes a two component lining with a more corrosion resistant refractory as the inner lining and an outer lining that has less corrosion resistance but better thermal insulating properties. A few metallic components such as injector nozzle, thermowells and refractory support rings, have to be used in the reaction vessel, but lifetimes have been limited. No material has been found that survives more than several months. The outer containment of the vessel is a metallic shell that is protected from excessively high temperature by the refractory lining on the inside and by forced flow of ambient air over the outer surface.

Heretofore, the need for suitable materials to contain high-temperature alkali-containing environments has not been fully met. What is needed is a suitable refractory material that solves the problem of degradation of containment materials for high-temperature alkali-containing environments such as black liquor and biomass gasifiers.

SUMMARY OF THE INVENTION

There is a need for the following embodiments of the invention. Of course, the invention is not limited to these embodiments.

According to an embodiment of the invention, a method comprises containing a high-temperature alkali salt containing environment using a refractory containment liner containing $MgAl_2O_4$ spinel. According to another embodiment of the invention, a method comprises forming a refractory brick containing $MgAl_2O_4$ spinel having an exterior chill zone defined by substantially columnar crystallization and an interior zone defined by substantially equiaxial crystallization; and removing at least a portion of the exterior chill zone from the refractory brick containing $MgAl_2O_4$ spinel by scalping the refractory brick containing $MgAl_2O_4$ spinel to define at least one outer surface having an area of substantially equiaxial crystallization. According to another embodiment of the invention, a product of manufacture comprises a refractory brick containing $MgAl_2O_4$ spinel including an interior zone defined by substantially equiaxed crystallization; and at least one outer surface having an area of substantially equiaxed crystallization.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of an embodiment of the invention without departing from the spirit thereof, and embodiments of the invention include all such substitutions, modifications, additions and/or rearrangements.

BRIEF DESCRIPTION OF THE DRAWINGS

The drawings accompanying and forming part of this specification are included to depict certain embodiments of the invention. A clearer conception of embodiments of the invention, and of the components combinable with, and operation of systems provided with, embodiments of the invention, will become more readily apparent by referring to the exemplary, and therefore nonlimiting, embodiments illustrated in the drawings, wherein identical reference numerals (if they occur in more than one view) designate the same elements. Embodiments of the invention may be better understood by reference to one or more of these drawings in combination with the description presented herein. It should be noted that the features illustrated in the drawings are not necessarily drawn to scale.

DESCRIPTION OF PREFERRED EMBODIMENTS

Figure 1:
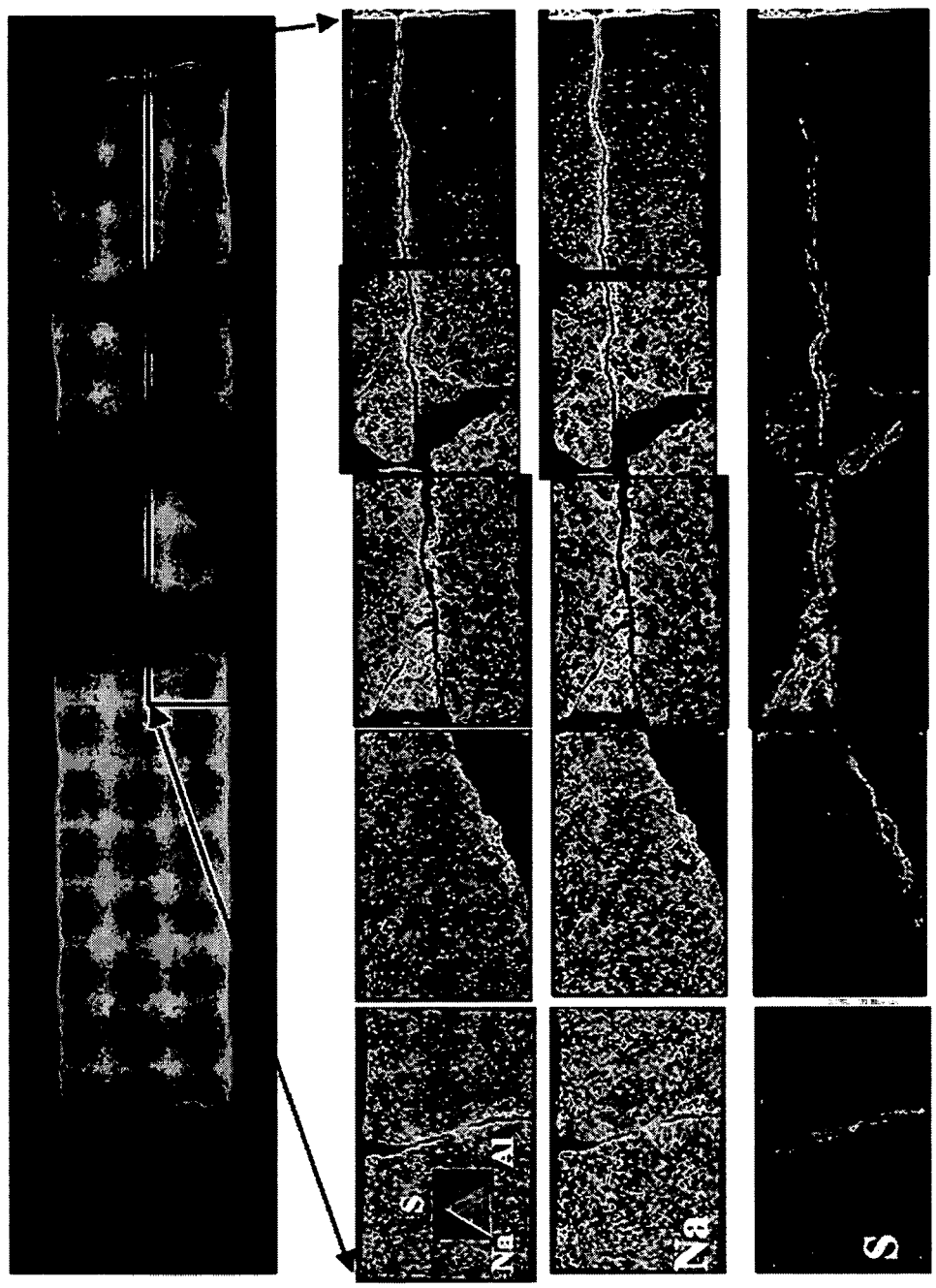
FIG. 1 is an elemental map of a fusion cast alumina sample, representing an embodiment of the invention.

Embodiments of the invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the embodiments of the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Within this application several publications are referenced by superscript Arabic numerals. Full citations for these, and other, publications may be found at the end of the specification immediately preceding the claims after the section heading References. The disclosures of all these publications in their entireties are hereby expressly incorporated by reference herein for the purpose of indicating the background of embodiments of the invention and illustrating the state of the art.

Embodiments of the invention can include the use of magnesium oxide/magnesium aluminum spinel refractories as containment materials for high temperature alkali environments such as found in black liquor or biomass gasification systems. It has been discovered that fusion-cast and/or bonded spinel refractory materials, either approximately stoichiometric or with excess MgO present, are unexpectedly advantageous and useful containment materials for black liquor gasification. In more detail, it has been discovered that fusion-cast spinel, and/or dense bonded spinel, refractory materials are unexpectedly advantageous and useful for containing high alkali molten salts produced during black liquor gasification. Other possible uses for these fusion-cast spinel and/or dense bonded spinel refractory materials include biomass gasification in the presence of alkali compounds including alkali compounds inherent to the biomass or added to the biomass to promote gasification.

The invention can include a refractory brick containing $MgAl_2O_4$, either approximately stoichiometric or with excess MgO. The invention can include a refractory containment liner containing $MgAl_2O_4$, either approximately stoichiometric or with excess MgO. The brick(s) and/or liner(s) can be substantially $MgAl_2O_4$ (at least approximately 90% $MgAl_2O_4$, either approximately stoichiometric or with excess MgO). The amount of $MgAl_2O_4$ can be at least approximately 95%. The amount of $MgAl_2O_4$ can be at least approximately 99%.

Test bricks of fusion-cast alumina, an alternate fusion-cast alumina, a bonded spinel and a fusion-cast spinel were incorporated during a relining of the New Bern black liquor gasifier and recovered for analysis. After six months of operation, eight core samples were removed from the relined New Bern gasifier. A ninth sample was removed two months later. These core samples were drilled perpendicular to the hot-face of the gasifier lining using a non-polar lubricant. As each sample was removed from the gasifier, it was vacuum-sealed to minimize exposure to moisture.

The halved core samples were examined visually and photographed. A Philip's X'Pert Pro diffractometer equipped with an X'celerator detector for rapid data collection (5 minutes/scan) was used to obtain x-ray diffraction (XRD) patterns. Initial XRD patterns were taken with programmable slits set for a constant diffraction area of 1×0.5 cm. Data were evaluated for the presence of reaction products.

Since XRD patterns only identify crystalline phases, a second sampling technique was undertaken to map the presence of sodium and sulfur within representative core samples. The four core samples of different refractory materials removed from the same general location were used for this analysis. Each refractory sample was examined using optical microscopy and then mapped using energy-dispersive x-ray spectroscopy (EDS).

When initial XRD patterns indicated the possibility of preferred orientation in the fusion-cast spinel, further characterization of the refractory microstructure was undertaken. Optical microscopic examination and preliminary XRD pole figures were taken on core samples of fusion-cast spinel from surfaces parallel and perpendicular to the hot face on a Sintag four-circle diffractometer using a 2 mm long collimator and Cr K$\alpha$1 radiation. Additional three pole figures for spinel and MgO were taken perpendicular to the hot face at the crack (parallel to the hot face) and at intervals above and below the crack. Pole figures of finely ground fusion-cast spinel were used as random standards for further analysis included rotating and normalizing the data using popLA[8].

Whole Bricks Removed at Eight Months

Three bricks were removed from row 2 of the barrel of the New Bern gasifier during a scheduled maintenance outage. The sample bricks (1—fusion-cast spinel, 2—fusion-cast reference alumina, and 3—bonded spinel) were identified for removal.

Analysis

Fusion-Cast Alumina

As the major component of the New Bern liner, reference samples of fusion-cast alumina were taken during every sampling from various heights within the gasifier. Four core-drilled samples were taken after eight months of operation and one of these bricks was completely removed a short time later. After 15 months, a number of reference samples were collected from different heights within the gasifier as the refractory liner was removed. Analysis from differing times and locations was used to evaluate refractory performance over time by location within the gasifier.

Four fusion-cast alumina reference core drilled reference samples were removed from different locations within the barrel of the New Bern gasifier.

All of the fusion-cast alumina core samples taken from different locations within the gasifier had horizontal and longitudinal cracking that extended at least half the length of the core. The last major crack in all these samples appeared at roughly the same distance, ~8 cm, from the cold face. A darkening of the originally white refractory material was seen in the area adjacent to the cracks as well as extending from the cold face inward. The darkening on the cold face was more pronounced lower in the barrel. Fusion-cast alumina reference core samples were sliced longitudinally revealing a surface layer and cracking extending from the hot face to roughly the same distance from the cold face.

XRD patterns revealed the presence of $NaAlO_2$ in the white layer on the hot face and minor to trace amounts in XRD patterns from the dark areas adjacent to cracks. XRD patterns were collected on the reference fusion-cast alumina refractory at the locations marked above with relative amount of $NaAlO_2$ indicated by color. The formation of $NaAlO_2$ indicates that sodium-containing salt penetrated along the cracks in sufficient quantity and at a high enough temperature to alter the adjacent $\alpha$-/$\beta$-alumina structures.

Referring to FIG. 1, elemental maps of reference fusion-cast alumina from the highlighted area of the core-drilled sample were overlapped as seen in the legend. Elemental mapping of sodium, sulfur and aluminum showed an increased presence of sodium and sulfur that roughly mirrored the dark areas observed on the hot face, around cracks on the hot face and along the cracks. Individual maps of sodium and sulfur are shown where the lighter shading represents higher elemental concentrations. The black areas are epoxy filled voids. This indicated that salt migration followed cracks from the hot face to the interior.

While the darkening along the cracks at the hot face may indicate salt penetration, the darkening observed at the cold face had to be due to other factors since there was no $NaAlO_2$ in the XRD patterns, no apparent sulfur nor an increase in sodium content observed near the cold face. This darkening is most likely due to migration of organic components from the tar impregnated aluminum silicate backup brick located behind the inner lining.

Fusion-cast alumina core samples did not appear to have lost an appreciable amount of material, as the original bricks were roughly seven inches thick and the core samples were similar in length. What was seen was significant cracking behind the liner surface considering the minimal spalling observed during operation. During maintenance shutdowns, some isolated surface blistering was also observed. Compression from neighboring bricks due to expansion may have been responsible for keeping the cracked surface layer in place.

Alternate Fusion-Cast Alumina

Two core samples of an alternate fusion-cast alumina were removed from locations near the bottom and top of the gasifier barrel lining and correspond to samples taken of the fusion-cast alumina reference material discussed above. Visual examination of the sections showed cracking extending further from the hot face than seen in corresponding samples of the reference fusion-cast alumina lining. The alternate fusion-cast alumina reference core samples were sliced longitudinally revealing a surface layer and cracking extending roughly ¾ of the distance from the hot face to the cold face. $NaAlO_2$ was observed in XRD patterns taken at the hot face surface and around the cracks.

Elemental maps of sodium, sulfur and aluminum showed an increased presence of sodium and sulfur on the hot face and along the cracks that roughly mirror the dark areas observed at the hot face and around cracks indicating that salt migration again followed cracks from the hot face into the interior. The crack paralleling the hot face has a layer of sodium and sulfur. Small cracks through the sections also have sodium and sulfur present.

The increased crack formation suggests salt diffusion is more pronounce in the alternate fusion-cast alumina brick that the reference fusion-cast alumina sample. The greater diffusion of salt or organics from the hot face or cold face respectively, indicates that the alternate alumina has a different microstructure and probably more connected porosity. It may be that salt diffusion is responsible for crack development and that the subsequent alteration to $NaAlO_2$ may expand and enhance crack propagation.

Bonded Spinel

During immersion testing, bonded spinel appeared less resistant to alkali salt penetration than the fusion-cast materials chosen for the lining. Thus bonded spinel test panels were installed with bonded spinel on the hot face and fusion-cast alumina brick directly behind it. This was to ensure stability of the liner if the bonded spinel degraded faster than anticipated. Upon initial installation, the bonded spinel brick was flush with the adjacent lining. Upon removal, the surface of the bonded spinel was recessed relative to the adjacent lining. The core sample of half bonded spinel and half fusion-cast alumina brick had some cracking parallel to the hot face and near the interface of the bonded spinel with the fusion-cast alumina backup brick. This could have occurred during installation or during core drilling and removal. When cut in half, the core sample showed no indication of longitudinal cracking. The core sample of bonded spinel was split longitudinally revealing a white layer on the hot surface and a crack roughly 4 cm below.

XRD patterns of the halved core section indicate that $NaAlO_2$ was the major phase present in the white layer on the hot face of the core sample. XRD patterns obtained on the halved core section indicated that $NaAlO_2$ was present as a major phase near the hot face and gradually diminished to trace amounts approaching the cold face. No $NaAlO_2$ was observed in the alumina backup brick. The amount of $NaAlO_2$ and gradually diminishes in the interior of the core. No $NaAlO_2$ was observed in the fusion-cast alumina half of the core sample.

Figure 2:
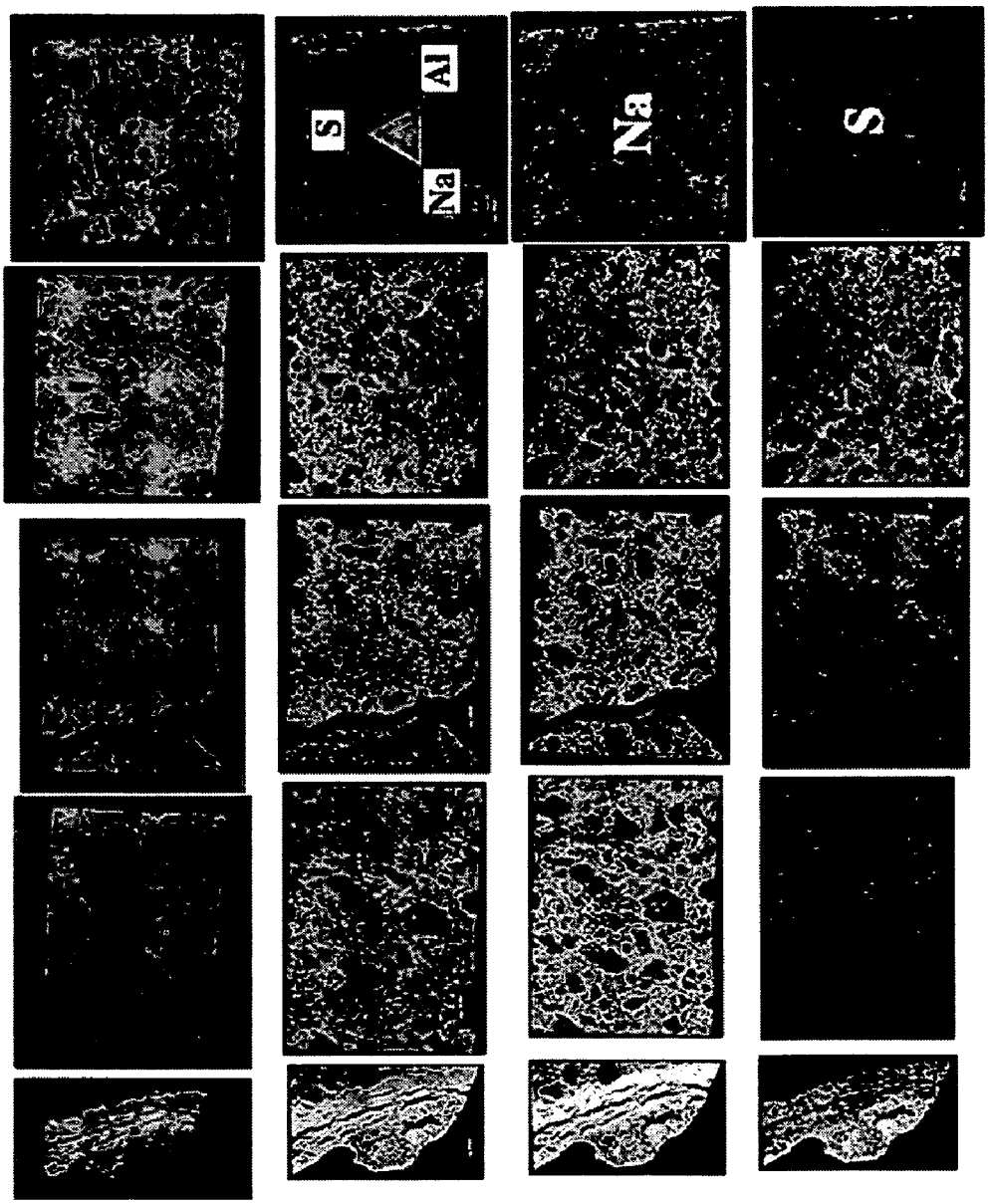
FIG. 2 is an elemental map of a bonded $MgAl_2O_4$ spinel sample, representing an embodiment of the invention.

Referring to FIG. 2, elemental maps from the bonded spinel core sample were overlapped. An overlay of the elemental maps of sodium, sulfur, magnesium and aluminum from the EDS examination indicate the sulfur and sodium are concentrated in a layer on the hot face and in the matrix between the MgO/spinel grain boundaries. Individual maps of sodium and sulfur are seen below (respectively) where the lighter shading represents higher elemental concentrations. The EDS maps of the white outer layer indicate it is layered. The outer layer is a combination of sodium and sulfur while in the inner layer has mostly sodium and aluminum present along with some sulfur. Inside the refractory the concentration of sodium and sulfur diminishes with distance from the hot face.

There was no difference in concentration at the crack indicating that this was not a major route for salt migration either because this crack did not extend to the surface or more likely was formed during drilling or shipping. Since the formation of $NaAlO_2$ from spinel is related to the amount of salt present in conjunction with the temperature gradients within the brick, the gradient of $NaAlO_2$ present in the core suggests that the molten salt migrates primarily from the hot face along the grain boundaries.

Fusion-Cast Spinel

Core drilled sample of fusion-cast spinel were taken after six months and after eight months of operation from adjacent bricks in the lower portion of the barrel of the New Bern gasifier. Two core samples of fusion-cast spinel were obtained from the center of the two adjacent test bricks. One was obtained during the initial outage and the second from an outage two months later. Both core samples of a fusion-cast spinel had a single crack parallel to and approximately 4 cm below the hot face. In the second sample, a longitudinal crack was observed to extended from the hot face most of the way to the cold face.

Figures 3A, 3B:
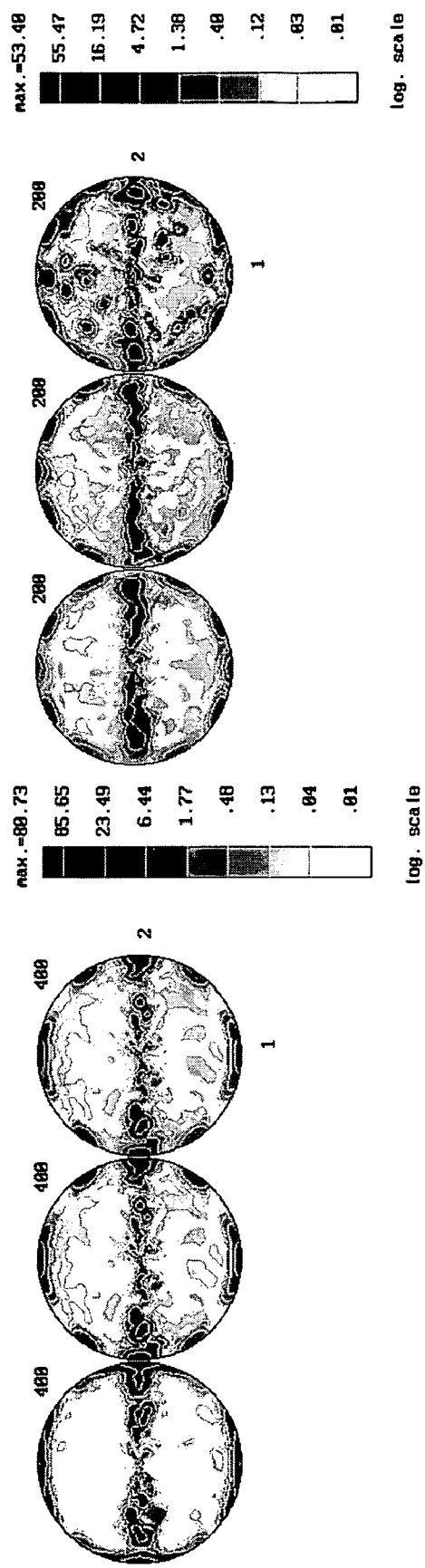
FIGS. 3A-3B are XRD pole figures of crystal phases of a fusion-cast refractory containing $MgAl_2O_4$ spinel, representing an embodiment of the invention.

The XRD patterns of $MgAl_2O_4$-spinel and MgO (periclase) near the hot face exhibited preferred orientation indicating that the crystals were aligned and not random. Referring to FIGS. 3A and 3B, pole figures of $MgAl_2O_4$-spinel (400) and MgO (200) were taken at 10 mm above, 5 mm above and 5 mm below the crack, from left to right respectively. Pole figures of the surfaces parallel and perpendicular to the hot face confirmed the presence of highly oriented texture for both spinel and MgO crystals above and below the formation of the crack. From the pole figures the (100) texture is oriented perpendicular to the hot face for both crystalline phases. It is important to note that the pole figures are less oriented 5 mm below the crack than at 5 or 10 mm above the crack.

XRD patterns taken from different location on both core samples indicated $NaAlO_2$ was present on the hot face and inside the crack parallel to the hot face. The skin surface of fusion-cast spinel was not only textured, but the associated connected porosity was directed perpendicular to the surface and provided a route for salt migration directly into the interior of the refractory. The molten salt on the hot surface migrated along the grain boundary of the long columnar crystals of the skin until it reaches the interface of the textured surface and more the randomly oriented crystallites in the interior. There the migration of salt slowed when the connected porosity was disrupted by the random orientation of first the MgO and then the spinel crystallites.

Figure 4:
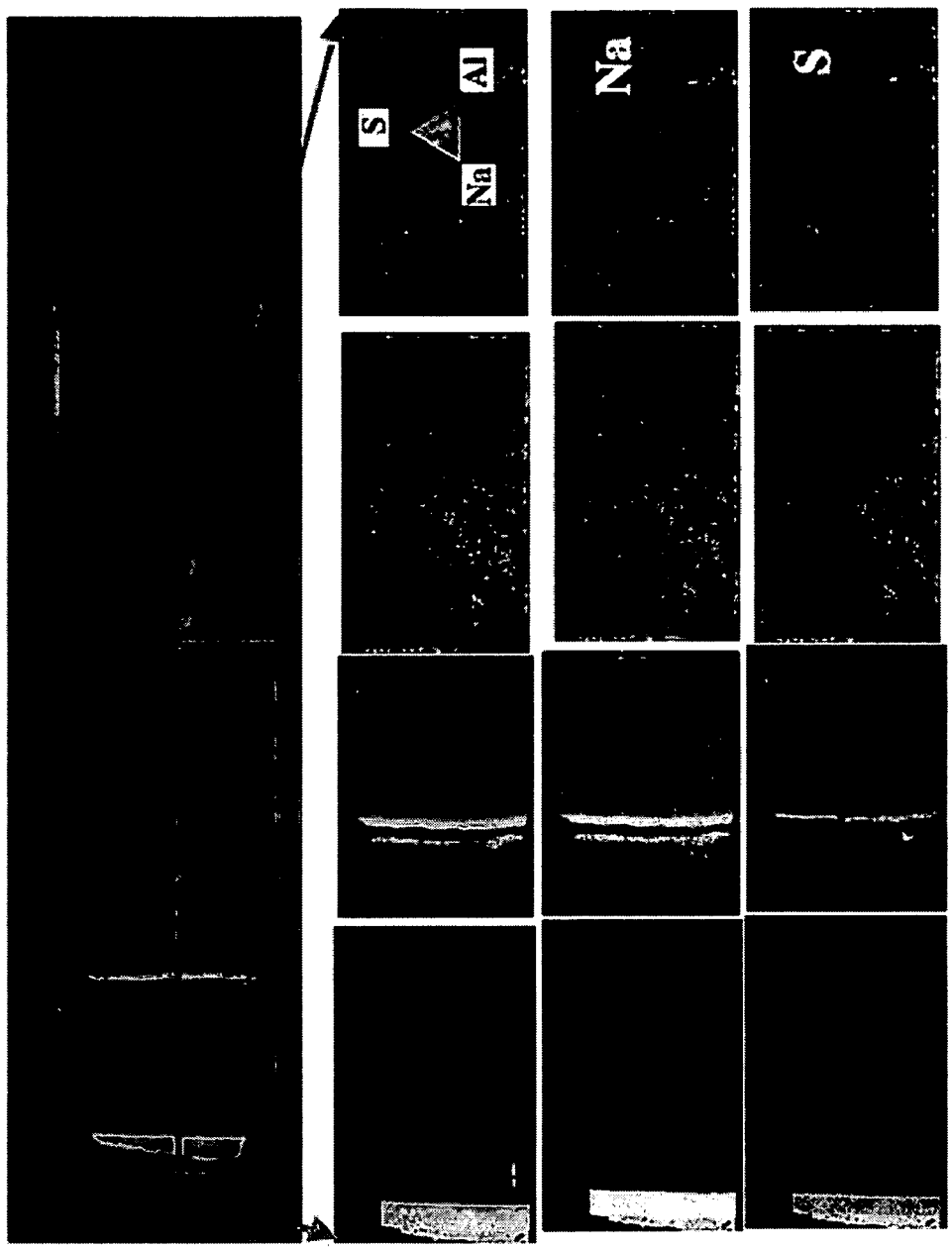
FIG. 4 is an elemental map of a fusion-cast refractory containing $MgAl_2O_4$ spinel, representing an embodiment of the invention.

FIG. 4 shows elemental maps from the hot face of the fusion-cast spinel core sample. The EDS maps of the fusion-cast spinel core show three distinct layers on the hot face surface over the base material. Individual maps of sodium and sulfur are shown in FIG. 4 where the lighter shading represents higher elemental concentrations.

Evaluation of Containment Refractory Materials in the New Bern Gasifier

Figure 5:
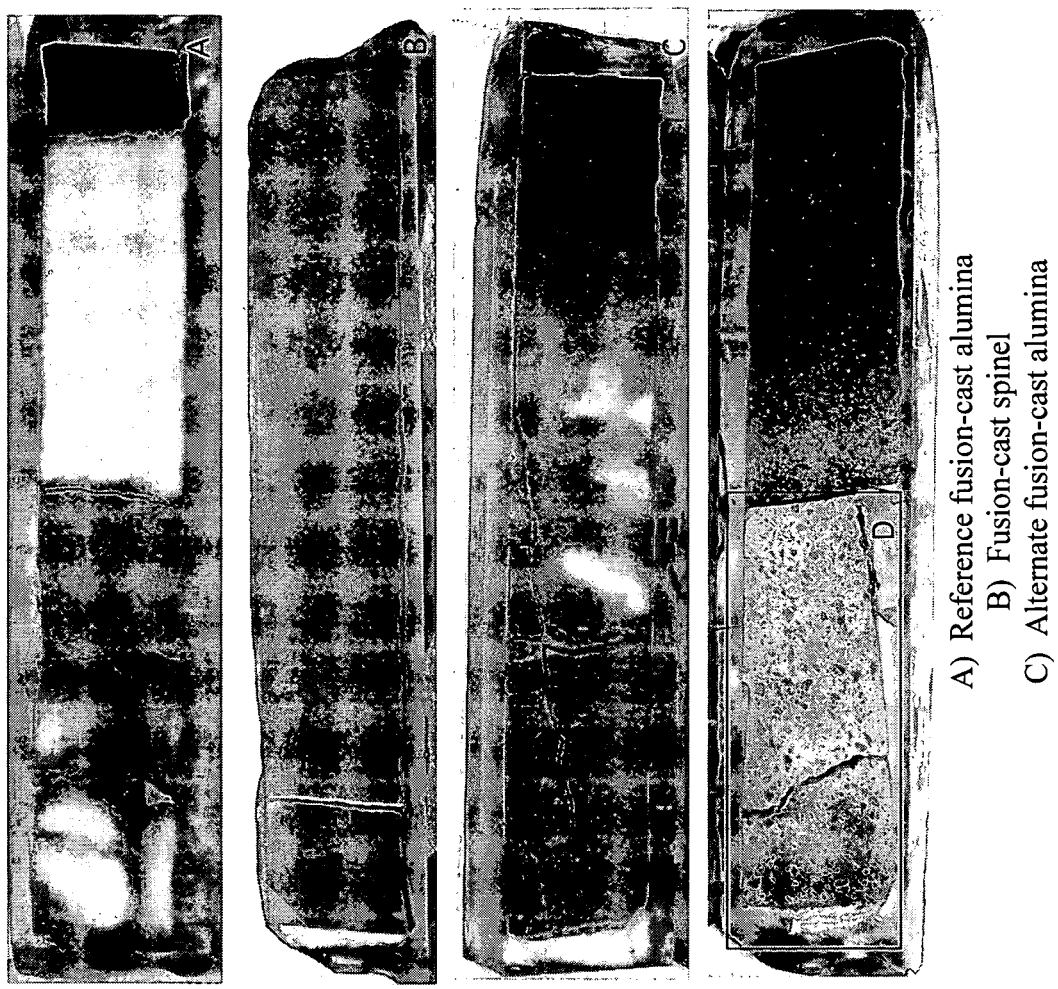
FIGS. 5A-5D are photographs of core-drilled refractory samples, representing an embodiment of the invention.

Referring to FIG. 5, photos of core-drilled samples collected from the New Bern gasifier after six months of service are shown. These are (A) reference fusion-cast alumina, (B) fusion-cast spinel, (C) alternate fusion-cast alumina, and (D) bonded spinel. Though the core samples are similar in length, there were some noticeable differences including the surface coating found on the core samples which differed in thickness and composition, the internal crack formation, and the mode of salt migration.

Crack formation was distinctly different for each sample and revealed different modes of salt penetration for each sample type. For the bonded spinel, salt migrated through the matrix phase. For the fusion-cast spinel, salt migrated along the oriented grains until the structure became more random. For the reference and alternate fusion-cast alumina refractories, direct comparisons of elemental maps and cross sections indicate that the migration of sodium and sulfur was along the cracks and then into the adjacent areas. Overall, there was less salt migration or cracking seen in the fusion-cast spinel than in the reference fusion-cast alumina samples. It is important to note that compared to bonded refractories, fusion-cast refractories limit salt penetration. For fusion-cast refractories, the manufacturing methods may limit salt migration along grain boundaries.

Effect of Microstructure on Refractory Performance

Connected porosity can affect the performance of nominally identical refractory products as seen in the performance of test bricks of bonded spinel and fusion-cast spinel. With nominally identical chemical composition the manufacturing process profoundly changed the observed connected porosity and microstructure with the fusion-cast having the superior salt resistance.

Even in the two test samples of fusion-cast alumina refractory material with nominally the same chemical formula, the samples behaved differently. Minimizing the connected porosity decreased salt penetration resulting in less cracking.

Within a given brick, the connected porosity or microstructure can vary. As seen in the fusion-cast spinel, the microstructure of the skin surface and interior of the refractory differ in rate of salt penetration. This difference is due to crystal nucleation and direction of growth that occurs on the casting surfaces during the fusion-casting process. For the $MgAl_2O_4$-spinel, after nucleation the crystals grow preferentially in one direction forming columnar grains. These grains align perpendicular to the surface and form a textured skin surface. Cooling is slower in the interior allowing the crystallites to be randomly distributed throughout the interior of the refractory brick. Modifying or eliminating the surface texture could improve the performance of these brick in a black liquor gasifier.

The fusion-cast spinel showed less cracking and reduced salt penetration indicating a better overall performance than either of the fusion-cast alumina samples. The bonded spinel appeared to perform adequately but not as well as the fusion-cast spinel.

Scalping a Refractory Brick Containing $MgAl_2O_4$ Spinel

Figure 6A:
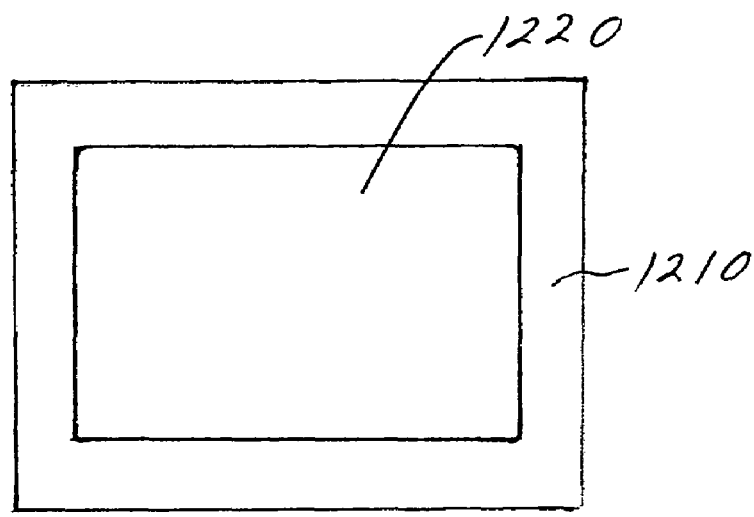
FIGS. 6A-6C are schematic views of methods of making fusion-cast refractory bricks containing $MgAl_2O_4$ spinel, representing an embodiment of the invention.
Figure 6B:
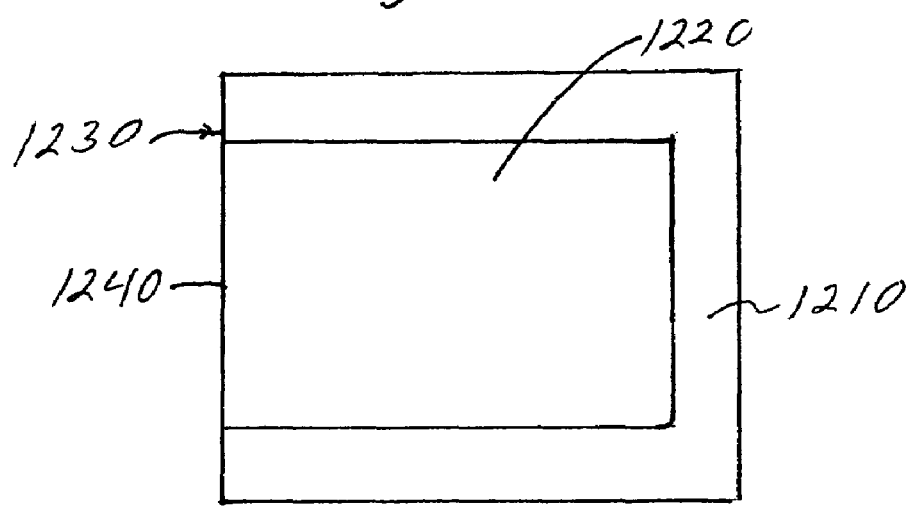
Figure 6C:
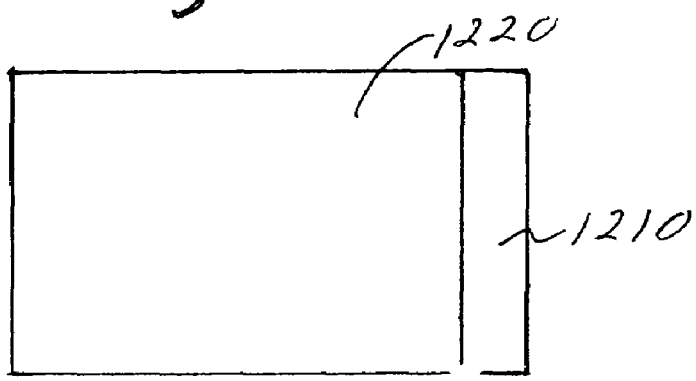

Referring to FIGS. 6A-6C, the invention can include methods of making a refractory brick containing $MgAl_2O_4$ spinel. Referring to FIG. 6A, a $MgAl_2O_4$ spinel refractory brick includes an exterior chill zone (identified as 1210 in FIG. 6) characterized by columnar crystals. The $MgAl_2O_4$ spinel refractory brick also includes an interior zone (1220) characterized by equiaxed crystals. The $MgAl_2O_4$ spinel refractory brick can be formed by bonding or by fusion-casting. Referring to FIG. 6B, at least a portion of the exterior chill zone has been removed from the $MgAl_2O_4$ spinel refractory brick by scalping the $MgAl_2O_4$ spinel refractory brick to define at least one outer surface (1230) having an area (1240) of substantially equiaxed crystallization. At least one outer surface (1230) can consist essentially of equiaxed crystallization. Referring to FIG. 6C, removal can include scalping to define at least five outer surfaces having areas of substantially equiaxed crystallization. The resulting bricks can be used to build refractory structures such as black liquor gasification refractory containment liners, biomass gasification refractory containment liners or other containment structures for alkali salts.

Definitions

The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The term proximate, as used herein, is intended to mean close, near adjacent and/or coincident; and includes spatial situations where specified functions and/or results (if any) can be carried out and/or achieved. The term deploying is intended to mean designing, building, shipping, installing and/or operating. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a or an are employed for grammatical style and merely for convenience.

The term plurality is intended to mean two or more than two. The term any is intended to mean all applicable members of a set or at least a subset of all applicable members of the set. The term means, when followed by the term "for" is intended to mean hardware, firmware and/or software for achieving a result. The term step, when followed by the term "for" is intended to mean a (sub)method, (sub)process and/or (sub) routine for achieving the recited result.

The terms "comprises," "comprising," "includes," "including," "contains," "containing," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. The terms "consisting" (consists, consisted) and/or "composing" (composes, composed) are intended to mean closed language that does not leave the recited method, apparatus or composition to the inclusion of procedures, structure(s) and/or ingredient(s) other than those recited except for ancillaries, adjuncts and/or impurities ordinarily associated therewith. The recital of the term "essentially" along with the term "consisting" (consists, consisted) and/or "composing" (composes, composed), is intended to mean modified close language that leaves the recited method, apparatus and/or composition open only for the inclusion of unspecified procedure(s), structure(s) and/or ingredient(s) which do not materially affect the basic novel characteristics of the recited method, apparatus and/or composition.

Unless otherwise defined, all technical and scientific terms used herein have the same meaning as commonly understood by one of ordinary skill in the art to which this invention belongs. In case of conflict, the present specification, including definitions, will control.

CONCLUSION

The described embodiments and examples are illustrative only and not intended to be limiting.

Although embodiments of the invention can be implemented separately, embodiments of the invention may be integrated into the system(s) with which they are associated. All the embodiments of the invention disclosed herein can be made and used without undue experimentation in light of the disclosure. Although the best mode of the invention contemplated by the inventor(s) is disclosed, embodiments of the invention are not limited thereto. Embodiments of the invention are not limited by theoretical statements (if any) recited herein. The individual steps of embodiments of the invention need not be performed in the disclosed manner, or combined in the disclosed sequences, but may be performed in any and all manner and/or combined in any and all sequences. The individual components of embodiments of the invention need not be formed in the disclosed shapes, or combined in the disclosed configurations, but could be provided in any and all shapes, and/or combined in any and all configurations. The individual components need not be fabricated from the disclosed materials, but could be fabricated from any and all suitable materials. Homologous replacements may be substituted for the substances described herein.

It can be appreciated by those of ordinary skill in the art to which embodiments of the invention pertain that various substitutions, modifications, additions and/or rearrangements of the features of embodiments of the invention may be made without deviating from the spirit and/or scope of the underlying inventive concept. All the disclosed elements and features of each disclosed embodiment can be combined with, or substituted for, the disclosed elements and features of every other disclosed embodiment except where such elements or features are mutually exclusive. The spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES

1 E. D. Larson, S. Consonni and R. E. Katofsky, "A Cost-Benefit Assessment of Biomass Gasification Power Generation in the Pulp and Paper Industry", Final Report, Oct. 8, 2003.

2 M. N. Mansour, R. R. Chandran and L. Rockvam, "The Evolution Of And Advances In Steam Reforming Of Black Liquor", Proceedings of the 2002 TAPPI Fall Conference & Trade Fair, Sep. 8-11, 2002, San Diego, Calif.

3 K. Whitty and L. Baxter, "State of the Art in Black Liquor Gasification Technology", Proceedings of the 2001 Joint AFRC/JFRC International Combustion Symposium, Sep. 9-12, 2001, Kauai, Hi. (2001).

4 L. Stigsson, "Chemrec™ Black Liquor Gasification", Proceedings of the International Chemical Recovery Conference, Tampa, Fla., pg 663-692, Jun. 1-4, 1998.

5 C. M. Hoffmann, J. R. Keiser, C. R. Hubbard, "Characterization of the Degradation Behavior of High Alumina Silica-Bonded Refractory Used as Gasifier Lining for Black Liquor Gasification", CRADA Final Report C/ORNL/97-0481, January 1999.

6 R. A. Peascoe, J. R. Keiser, C. R. Hubbard, J. P. Gorog, C. A. Brown and B. Nilsson, "Comparison Of Refractory Performance In Black Liquor Gasifiers And A Smelt Test System", Proceedings of the International Chemical Recovery Conference, Whistler, British Columbia, pg. 297-300, Jun. 11-14, 2001.

7 J. R. Christle, A. J. Darnell and D. f. Dustin, "Reaction of Molten Sodium Carbonate with Aluminum Oxide", J. Phys. Chem., 82, 1, pg. 33-37, 1978.

8 J. S. Kallend, U. F. Kocks, A. D. Rollett, and H. R. Wnnk, "popLA—Preferred Orientation Package—Los Alamos", Los Alamos National Laboratory, Los Alamos, N.M., 1993.

What is claimed is:

1. A method, comprising containing a high-temperature alkali salt containing environment using a refractory containment liner containing $MgAl_2O_4$ spinel
   forming a refractory brick containing $MgAl_2O_4$ spinel having an exterior chill zone defined by substantially columnar crystallization and an interior zone defined by substantially equiaxed crystallization; and
   removing at least a portion of the exterior chill zone from the refractory brick containing $MgAl_2O_4$ spinel by scalping the refractory brick to define at least one outer surface having an area of substantially equiaxed crystallization,
   wherein the refractory containment liner containing $MgAl_2O_4$ spinel includes the refractory brick containing $MgAl_2O_4$ spinel,
   wherein removing includes scalping to define at least five outer surfaces having areas of substantially equiaxed crystallization.

2. The method of claim 1, wherein the refractory containment liner containing $MgAl_2O_4$ spinel includes a plurality of fusion-cast refractory bricks containing $MgAl_2O_4$ spinel.

3. The method of claim 1, wherein the refractory containment liner containing $MgAl_2O_4$ spinel includes a plurality of fusion-cast refractory bricks containing $MgAl_2O_4$ spinel that are non-stoichiometric and include excess MgO.

4. A method of black liquor gasification comprising the method of claim 1.

5. A method of biomass gasification comprising the method of claim 1.

* * * * *